United States Patent [19]

Morscheck et al.

[11] 4,428,469
[45] Jan. 31, 1984

[54] SYNCHRONIZER SPRING PIN

[75] Inventors: Timothy J. Morscheck, Kalamazoo, Mich.; Robert R. Byar, Medina, Ohio; Theodore J. Deska, Warren, Mich.

[73] Assignee: Eaton Corporation, Cleveland, Ohio

[21] Appl. No.: 288,724

[22] Filed: Jul. 31, 1981

[51] Int. Cl.³ .............. F16D 11/00; F16D 13/00; F16H 3/38
[52] U.S. Cl. .................... 192/53 E; 74/339
[58] Field of Search .............. 192/53 A, 53 B, 53 C, 192/53 E, 53 F; 74/339

[56] References Cited

U.S. PATENT DOCUMENTS

| 2,179,568 | 11/1939 | White | 192/53 F |
|---|---|---|---|
| 2,193,672 | 3/1940 | Dolza | 192/53 A |
| 2,275,718 | 3/1942 | Beringer | 192/53 A |
| 2,470,208 | 5/1949 | Avila | 192/53 F |
| 2,814,373 | 11/1957 | Bixby | 192/53 B |
| 3,078,975 | 2/1963 | Eaton | 192/53 E |
| 3,529,484 | 9/1970 | Tomita et al. | 74/339 |
| 3,583,536 | 6/1971 | Magnier | 192/53 A |
| 3,910,390 | 10/1975 | Eichinger | 192/53 F X |
| 3,980,164 | 9/1976 | Labat et al. | 192/53 F X |
| 4,018,319 | 4/1977 | Thomas | 192/53 E |
| 4,125,179 | 11/1978 | Cochran et al. | 192/53 |
| 4,252,222 | 2/1981 | Morscheck | 192/53 F |

FOREIGN PATENT DOCUMENTS

| 925443 | 7/1949 | Fed. Rep. of Germany | 192/53 F |
|---|---|---|---|
| 261488 | 6/1926 | United Kingdom | 192/53 F |
| 791919 | 3/1958 | United Kingdom | 192/53 F |

Primary Examiner—Gary L. Smith
Assistant Examiner—Lloyd A. Gall
Attorney, Agent, or Firm—C. H. Grace; P. S. Rulon

[57] ABSTRACT

A double acting synchronizer clutch (20) is disclosed with sheet metal spring pins (34). The spring pins are disposed at their ends in arcuate recesses in friction rings (28-30). Each spring pin (34) includes a unitary member (36) having split end rings (36a and 36b) and a plurality of spring leafs (36c) interconnecting the split ends which snugly receive closed rings (38 and 40) to prevent radial flexing of the split end rings. Two additional embodiments (46 and 47) of the spring pins are disclosed which embody the principles of pins (34).

10 Claims, 6 Drawing Figures

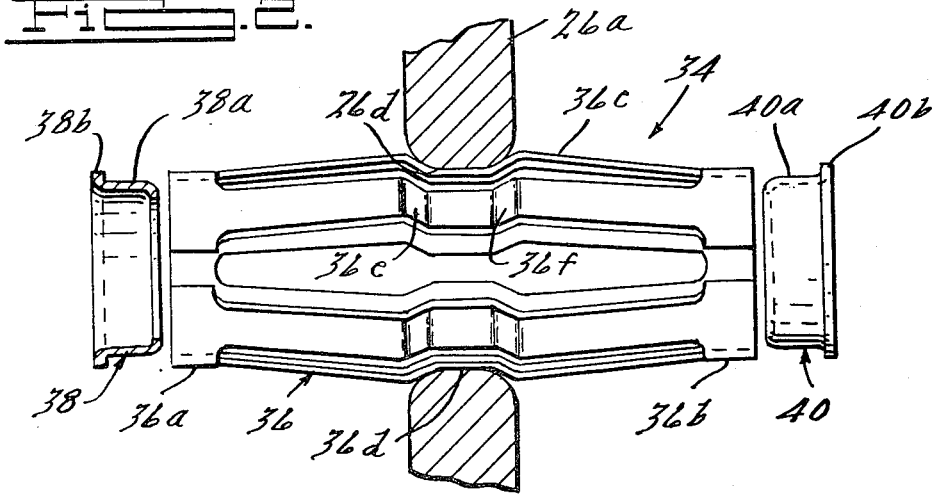
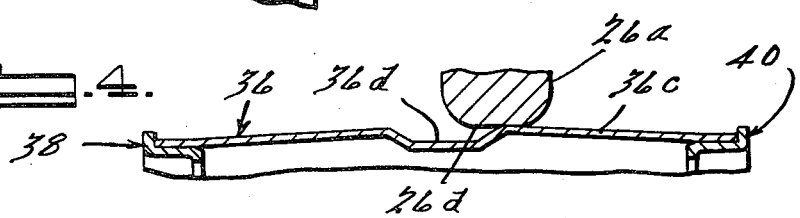
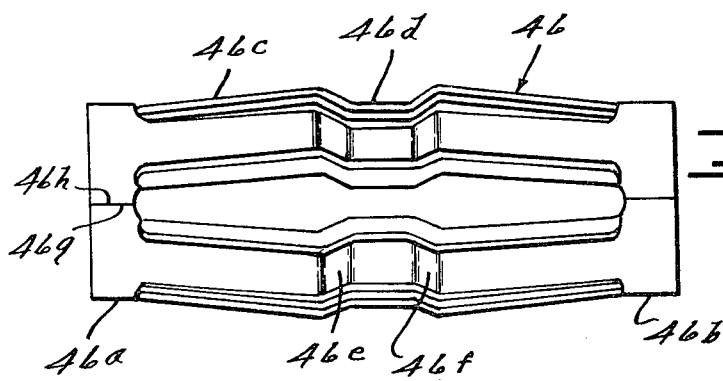
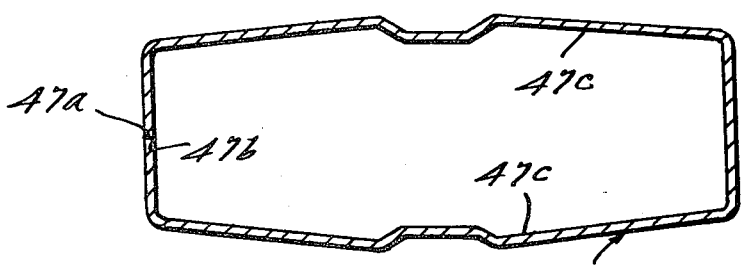

4,428,469

SYNCHRONIZER SPRING PIN

FIELD OF THE INVENTION

The invention relates to a clutch having jaw clutch members and friction means to synchronize the jaw clutch members and to engage blockers to prevent asynchronous engagement of the jaw clutch members prior to synchronization. Specifically, the invention relates to spring pins for initially engaging the friction means in response to incipient engaging movement of one of the jaw clutch members.

BACKGROUND OF THE INVENTION

Clutches of the above type are well-known and are commonly referred to as synchronizers or synchronizer clutches. Many synchronizer clutches include a friction clutch(es) to synchronize the jaw clutch members, blockers to prevent contact or engagement of the jaw clutch members prior to synchronization, and springs or (as herein) spring pins. The spring pins effect engagement of the blockers by initially moving the friction clutch into engagement with a relatively low force in response to incipient engaging movement of one of the jaw clutch members. One species of such synchronizer clutches are the double acting synchronizer clutches disclosed in U.S. Pat. Nos. 2,667,955 and 4,125,179 to L. A. Bixby and P. R. Cochran, et al, respectively. The Bixby patent discloses spring pins which each consist of a pair of rigid semicylindrical members biased part by a spring disposed in a cavity defined by the rigid members. The spring pins of Bixby are believed to be rather expensive relative to the spring pins disclosed herein. The Cochran patent discloses compressible C-shaped spring pins. The spring pins of Cochran are believed to be substantially less expensive to produce than the spring pins of Bixby. However, the spring pins of Cochran are also believed to be subjected to rather high stresses when the pins compress, i.e., when the pins flex radially inward.

SUMMARY OF THE INVENTION

An object of this invention is to provide an inexpensive, reliable, and long life spring pin for a synchronizer clutch.

According to an important feature of the invention, a spring pin includes a unitary sheet metal member having first and second C-shaped ends joined together by at least two beam or leaf springs extending therebetween and means to prevent radial flexing of the C-shaped ends; the beams or leafs are bowed radially outward from each other in barrel stave fashion and are pinched radially inward toward each other at a position between the ends to define an annular detent groove. An important advantage of this spring pin is that the spring beams or leafs are subjected to relatively low stresses and therefore are reliable and long-lived.

BRIEF DESCRIPTION OF THE DRAWINGS

A synchronizer clutch with the spring pins of the instant invention is shown in the accompanying drawings in which:

FIG. 2 is a somewhat enlarged, exploded view of the spring pin in FIG. 1 with a portion thereof in section;

FIG. 4 is a vertically sectioned view of a portion of the spring pin in FIGS. 1 and 2; and FIGS. 5 and 6 are alternative embodiments of the spring pin.

Certain terminology referring to specific types of components, direction, motion, and the relationship of components to each other will be used in the following description. This terminology is for convenience in describing the invention and its environment and should not be considered limiting unless explicitly used in the appended claims.

DETAILED DESCRIPTION OF THE DRAWINGS

Figure 1:
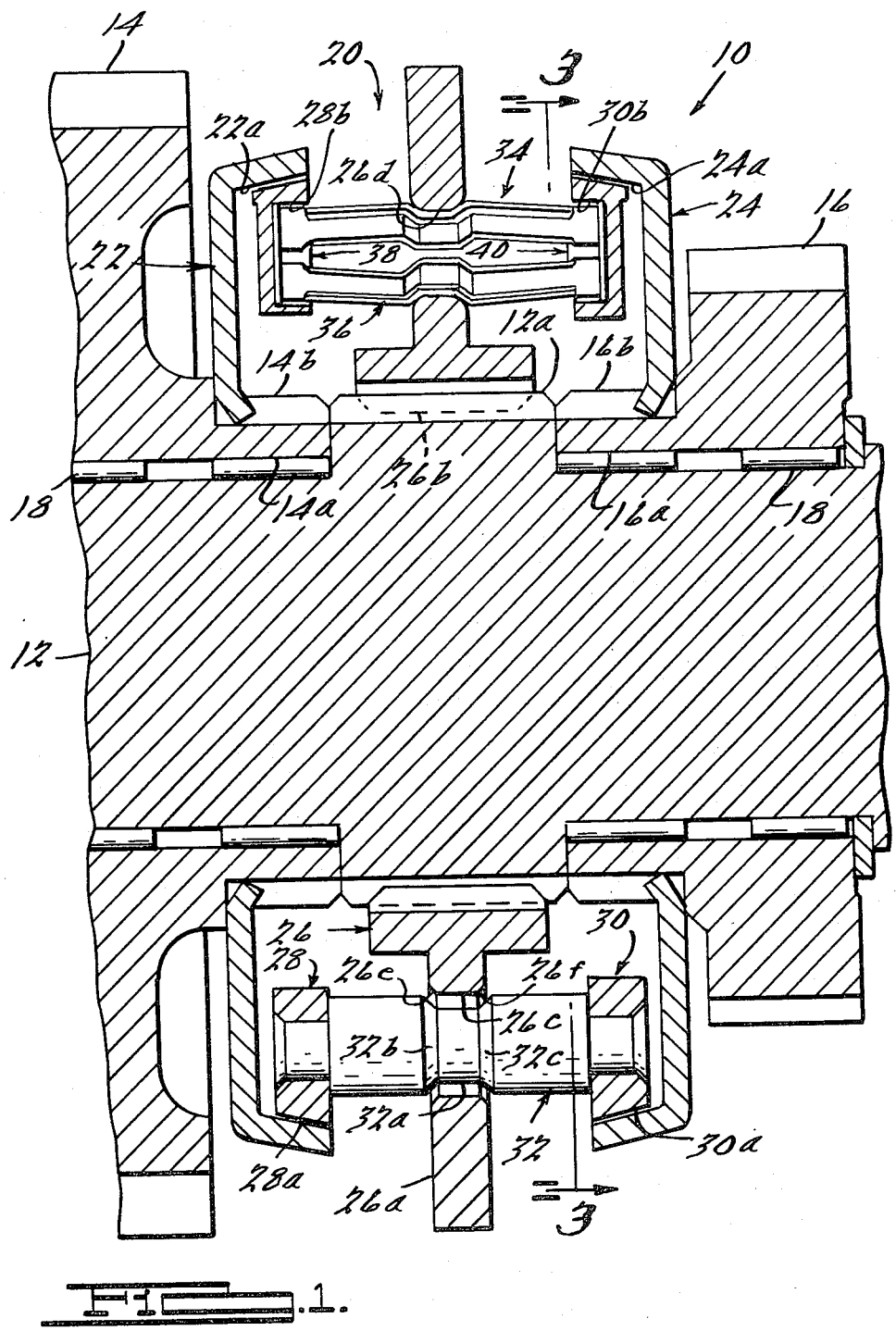
FIG. 1 is a vertically sectioned view of a double acting synchronizer clutch with one of the spring and blocker pins shown in relief.

Looking first at FIG. 1, therein is shown a portion 10 of an otherwise unshown transmission adapted for use in an unshown land vehicle, but not limited to such use. Portion 10 includes a shaft 12 mounted for rotation, spaced apart gears 14 and 16 rotationally supported on the shaft by roller bearings 18, and a double acting synchronizer clutch assembly 20 for selectively coupling either gear to the shaft. When portion 10 is in the unshown transmission, gears 14 and 16 will be in constant mesh with gears which may drive or be driven by gears 14 and 16.

Synchronizer clutch assembly 20 includes jaw clutch members 14a and 16a having external spline shaped jaw teeth 14b and 16b formed on annular hub extensions of the gears, friction rings 22 and 24 rotatably fixed to gears 14 and 16 respectively by splines 14b and 16b and having ring or cone friction surfaces 22a and 24a, a slidable positive type jaw clutch member 26 having a radially outwardly extending flange portion 26a, friction rings 28 and 30 having ring or cone friction surfaces 28a and 30a, a plurality of (herein three) blocker pins 32 rigidly connecting rings 28 and 30 together for rotation above a common axis defined by shaft 12, and a plurality of (herein three) spring pins 34. The outer periphery of flange 26a is gripped by an unshown and conventional shift fork moved right or left to respectively effect coupling of gear 16 or 14 to shaft 12.

Jaw clutch member 26 includes internal spline shaped jaw clutch jaw teeth 26b slidably engaged with splines 12a defined by shaft 12, a first set of three circumferentially spaced openings 26c having blocker pins 32 slidably extending therethrough, and a second set of three openings 26d circumferentially spaced between openings 26c and slidably receiving spring pins 34. Openings 26d are preferably rounded as shown to negate sharp edge contact with the associated spring pins. However, the opening may be chamfered. Blocker pins 32 include a reduced diameter portion or groove 32a spaced (herein midway) between rings 28 and 30. Each reduced diameter portion when aligned with its respective opening 26c, allows limited rotation of jaw clutch member 26 relative to friction rings 28 and 30. The reduced diameter portion also defines beveled blocking shoulders 32b and 32c which cooperate with chamfered shoulders 26e and 26f when the reduced diameter portion moves out of concentric alignment with its respective opening to allow the limited relative rotation between jaw clutch member 26 and friction ring 28 and 30.

Figure 3:
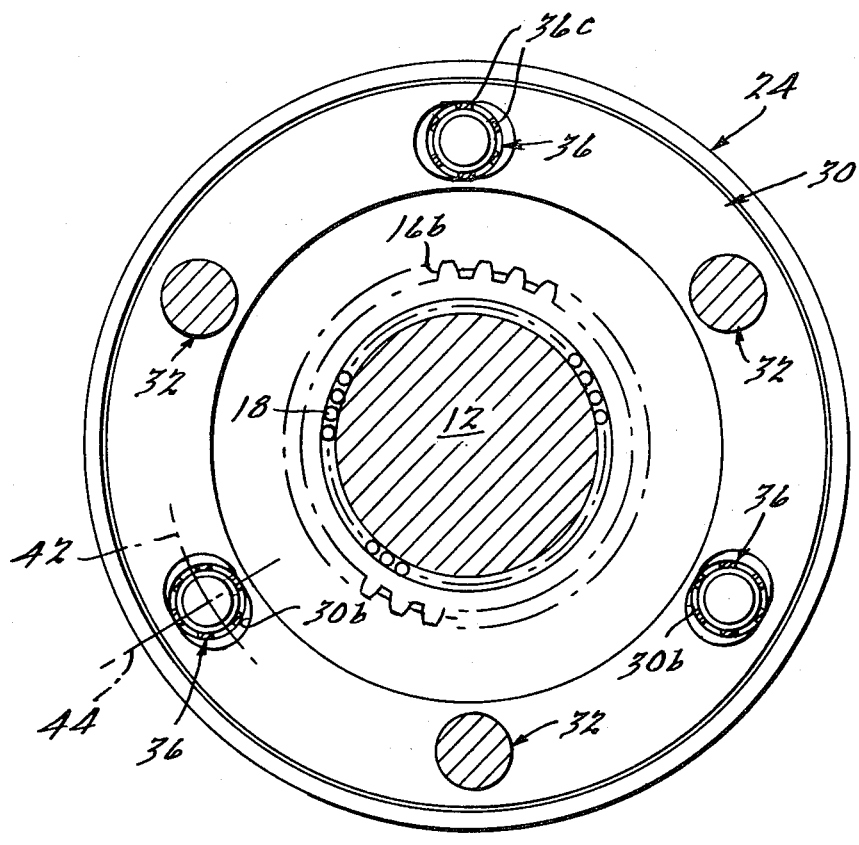
FIG. 3 is a sectioned view of the synchronizer clutch looking along line 3—3 of FIG. 1.

Looking now at FIGS. 1-3, spring pin 34 includes a unitary member 36 and end caps or closed rings 38 and 40. Member 36 includes split end rings 36a and 36b and a plurality of (herein six) beam or spring leafs 36c. The leafs are disposed generally parallel to and circumferentially spaced about the longitudinal axis of the pin, are bowed radially outward in barrel stave fashion, and are pinched radially inward toward each other at a position (herein midway) between the split ends. The pinched portions of the leafs collectively define an annular detent groove 36d having beveled shoulders 36e and 36f which provide a neutral position for flange 26a of jaw clutch member 26. The minimum diameter of groove 36d is slightly less than the inside diameter of openings 26d and the maximum diameter of beveled shoulders 36e and 36f is greater than the minimum diameters of openings 26d. The width of spring pin groove 36d is less than the width of blocker pin grooves 32a so that the spring pin shoulders 36e and 36f will make contact with flange 26a before the blocker pin shoulders 32b and 32c. Closed rings 38 and 40 respectively include a cylindrical portion 38a and 40a and a radially outwardly extending flange portion 38b and 40b. The cylindrical portions prevent radial flexing or compressing of split end rings 36a and 36b. The flange portions provide the spring pins with an increased surface or load bearing surface to prevent or reduce wear of the associated portions of friction rings 28 and 30 contacted thereby. FIG. 4 shows one leaf 36c of the spring pin in cross section with opening 26d of the flange moved rightward out of detent groove 36d.

The split end rings and closed rings of both ends of the spring pins are received by identical elongated, arcuate recesses or blind openings 28b and 30b in the mutually facing sides of friction rings 28 and 30. Looking at one of the recesses 30b in ring 30 of FIG. 3, the recess includes a curved major extent 42 which coincides with an arc of a circle drawn from the rotational axis of shaft 12 and a minor extent 44 which coincides with a radius of the circle and bisects the major extent. The shoulders defining the minor extent or radial width of each recess are slightly wider than the diameter of the spring pin ends and provide radial support to hold friction rings 28 and 30 relatively concentric with mating friction rings 22 and 24. The major extent of each recess allows the previously mentioned limited relative rotation between flange 26a and friction rings 28 and 30 without side loading of the spring pins in openings 26d. Such side loading would cause a counter or unblocking torque which in some cases could entirely prevent effective blocking action by blocker pins 32 and at least cause premature unblocking of the blocker pins.

Recesses 28b and 30b may be elongated slots with the major extent thereof straight and substantially tangent to the circle drawn to the rotational axis of shaft 12. However, in this case the minor extent of the slots is preferably wide enough to allow arcuate movement of the spring pin ends in the slots without side loading.

OPERATION

When flange 26a is in the neutral position of FIG. 1, the associated cone surfaces of the friction rings are slightly paced apart, spring pins 36 are substantially concentric with openings 26d in the flange, and the reduced diameter portions 32a of the blocker pins are aligned with their respective openings 26c but are not necessarily concentric with openings 26c. When it is desired to couple either gear to shaft 12, an appropriate shift mechanism connected to flange 26a via the unshown shift fork moves the flange axially along the axis of shaft 12 either left to couple gear 14 or right to couple gear 16. Incipient movement of the flange is transmitted from the rounded shoulders of openings 26d to the beveled shoulders defined by the leaf springs and to the appropriate friction ring to effect initial frictional engagement of the friction ring with the mating friction ring. The force of the initial engagement is determined by the spring rate of spring leafs 36c which bend radially inward. The initial engagement (provided the gear to be coupled is not synchronous with shaft 12) ensures limited relative rotation between flange 26a and the engaged friction ring and hence movement of the reduced diameter portion of the blocker pins to the appropriate side of openings 26c to provide blocking by engagement or contact of the beveled shoulders defined by the blocker pins and the chamfered shoulders of openings 26c. When the blockers are engaged, the full axial force on flange 26a is transmitted to the beveled shoulders of the blocking pins. The full axial force increases the frictional engagement for increasing synchronizing torque between the gear and shaft and imparts an unblocking torque between the flange and blocker pins. During conditions of substantial nonsynchronous rotation, the unblocking torque is less than the synchronizing torque due to the self-engaging characteristics of the cone surface and due to the angular relationship between the chamfered and beveled shoulders. As substantial synchronism is reached, the synchronizing torque drops below the unblocking torque, whereby the blocker pins move into a concentric relationship with opening 26c and allow continued axial movement of the flange and engagement of the jaw clutch members.

Looking now at the alternative embodiment of spring pin 46 in FIG. 5, spring pin 46 is substantially the same as the unitary member 36. That is, spring pin 46 is a unitary member including split end rings 46a and 46b and a plurality of (herein six) spring leafs 46c. Leafs 46c are bowed radially outward in barrel stave fashion and pinched radially inward toward each other at a position (herein midway) between the split ends. The pinched portions of the leafs collectively define an annular detent groove 46d having beveled shoulders 46e and 46f which provide or define a neutral position for flange 26a of the jaw clutch member 26. Spring pin 46 differs from spring pin 34 by omitting the closed rings and by extending the adjacent ends 46g and 46h of the split ends so that they are in abutting contact to prevent radial flexing of the split ring. The adjacent ends could also be welded together or secured together by other means.

The alternative spring pin 47 of FIG. 6 is formed from a elongated strip of spring steel having abutting ends 47a and 47b and two spring leafs 47c diametrically across from each other and of substantially the same shape as spring leafs 36c and 46c.

Three embodiments of the instant invention have been disclosed for illustrative purposes. Many variations and modifications of the disclosed embodiments are believed to be within the spirit of the invention. For example, the unitary sheet metal spring members disclosed herein may be formed from other materials such as wire. The following claims are intended to cover the inventive portions of the disclosed embodiments and variations and modifications believed to be within the spirit of the invention.

What is claimed is:
1. A spring comprising:
   a unitary sheet metal spring pin having first and second C-shaped end rings and at least two spring leafs extending therebetween, said leafs bowed radially outward from each other in barrel stave fashion and pinched radially inward toward each other at a position between said ends to define a detent groove; and means to prevent radial flexing of said C-shaped ends.

2. The spring of claim 1, wherein said means to prevent includes:

a closed ring snugly received in each end ring to prevent said radial flexing of each end ring.

3. The spring of claim 2, wherein each closed ring includes:

a radially extending flange portion.

4. The spring of claim 1, 2, or 3, wherein said at least two spring leafs includes six spring leafs.

5. In a double acting synchronizer clutch of the type including two axially moveable friction rings rigidly connected together about a common rotational axis in axially spaced relation on opposite sides of an axially moveable, radially extending flange having a plurality of circumferentially spaced openings each slidably receiving a detent groove of a spring means when the flange is axially positioned in a neutral position between the friction rings, the spring means being operative in response to axial movement of the flange along the common axis to resiliently move the friction rings in the direction of the movement into frictional engagement with a mating friction ring; improved spring means each comprising:

a unitary sheet metal spring pin having first and second C-shaped end rings and at least two spring leafs extending therebetween, said leafs bowed radially outward from each other in barrel stave fashion and pinched radially inward toward each other at a position between said ends to define a detent groove; and means to prevent radial flexing of said C-shaped ends.

6. The improvement of claim 5, wherein said means to prevent includes:

a closed ring snugly received in each end ring to prevent said radial flexing of each end ring.

7. The improvement of claim 6, wherein each closed ring includes:

a radially extending flange portion.

8. The improvement of claim 5, 6, or 7, wherein said at least two spring leafs includes six spring leafs.

9. Improved spring pins for a double acting synchronizer clutch disposed between two gears mounted for rotation about the axis of a shaft, the synchronizer clutch including a toothed clutch member slidably splined to the shaft and bidirectionally moveable along the shaft to engage mating clutch teeth fixed for rotation with the gears, a flange fixed to and projecting radially from the toothed clutch member, a plurality of first and second circumferentially disposed and alternately positioned openings defined by the flange, first and second friction rings rigidly connected together in axially spaced relation by pins extending through the first openings, substantially midway between the friction rings the pins have a reduced diameter for allowing limited relative rotation between the rings and flange and for defining blocking shoulders engageable with the flange about the openings to prevent asynchronous engagement of the clutch member teeth with the mating teeth fixed to the gears, and the improved spring pins each comprising:

a unitary sheet metal member including first and second split end rings in abutting relation with the spaced apart friction rings and joined together by at least four spring leafs disposed generally parallel to and circumferentially spaced about the longitudinal axis of the pin and extending through one of the second openings, said spring leafs bowed radially outward in barrel stave fashion and pinched radially inward at a position substantially midway between the friction rings to define an annular detent groove having radially outwardly tapering end walls engageable with the flange about the second opening for transmitting a predetermined resilient force to the friction rings and moving the axially moveable friction rings into engagement with the axially fixed friction rings; and a closed ring snugly received in each split ring to prevent radial flexing of each split ring.

10. The improvement of claim 9, wherein each closed ring includes:

a radially extending flange portion.

* * * * *